US012032933B2

United States Patent
Xue et al.

(10) Patent No.: US 12,032,933 B2
(45) Date of Patent: Jul. 9, 2024

(54) COMPILING SYSTEM AND COMPILING METHOD FOR PROGRAMMABLE NETWORK ELEMENT

(71) Applicant: ZHEJIANG LAB, Zhejiang (CN)

(72) Inventors: Lei Xue, Hangzhou (CN); Tao Zou, Hangzhou (CN); Ruyun Zhang, Hangzhou (CN); Jun Zhu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/495,707

(22) Filed: Oct. 26, 2023

(65) Prior Publication Data

US 2024/0061663 A1  Feb. 22, 2024

Related U.S. Application Data

(63) Continuation of application No. PCT/CN2023/101230, filed on Jun. 20, 2023.

(30) Foreign Application Priority Data

Jul. 22, 2022 (CN) .......................... 202210869507.5

(51) Int. Cl.
G06F 8/41 (2018.01)
G06F 9/445 (2018.01)

(52) U.S. Cl.
CPC .......... *G06F 8/443* (2013.01); *G06F 9/44505* (2013.01)

(58) Field of Classification Search
CPC .............................. G06F 8/443; G06F 9/44505
See application file for complete search history.

(56) References Cited

U.S. PATENT DOCUMENTS

2003/0033519 A1\* 2/2003 Buckman ................ H04L 67/34
713/153
2021/0326175 A1\* 10/2021 Herbert .................. G06F 9/4881

FOREIGN PATENT DOCUMENTS

CN          112181382 A       1/2021
CN          113051053 A       6/2021
(Continued)

OTHER PUBLICATIONS

Michel et al., "The Programmable Data Plane: Abstractions, Architectures, Algorithms, and Applications" (Year: 2021).\*
(Continued)

*Primary Examiner* — Phillip H Nguyen
(74) *Attorney, Agent, or Firm* — W&G Law Group

(57) ABSTRACT

The present disclosure discloses a compiling system for a compiling system and a compiling method for a programmable network element. Aiming at the diversified requirements of network modals for the underlying hardware resources, the system realizes the integration and fusion mechanism of computing/storage/forwarding/security, and abstracts network element equipment including heterogeneous hardware resources and isomeric hardware resources into a logical network element irrelevant to the underlying hardware; performs advanced abstract encapsulation on the heterogeneous hardware resources and isomeric hardware resources, supports flexible calling of underlying hardware and software resources, uses the technology of functional equivalent replacement between heterogeneous hardware resources and isomeric hardware resources, realizes switching and co-processing of network modals among hardware resources according to actual requirements, allocates heterogeneous hardware resources according to modal characteristics, and calls various compilers to automatically generate and optimize modal packet processing pipelines.

7 Claims, 5 Drawing Sheets

(56) References Cited

FOREIGN PATENT DOCUMENTS

| CN | 114115834 A   |   | 3/2022 |
|----|---------------|---|--------|
| CN | 114938322 A   |   | 8/2022 |
| JP | 2016519487 A  | * | 3/2014 |
| WO | 2022087442 A1 |   | 4/2022 |

OTHER PUBLICATIONS

Xing et al., "A Vision for Runtime Programmable Networks" (Year: 2021).*
Bifulco et al., "A Survey on the Programmable Data Plane: Abstractions, Architectures, and Open Problems" (Year: 2018).*
Song et al., "Fine-Grained Pipeline Parallelization for Network Function Programs" (Year: 2021).*
International Search Report (PCT/CN2023/101230); Date of Mailing: Aug. 18, 2023.
First Office Action(CN202210869507.5); Date of Mailing: Sep. 2, 2022.
Notice of Allowance(CN202210869507.5); Date of Mailing:.Sep. 27, 2022.
A-Object-Oriented-Single-Image-Space-Model-For-Metasystem.
A-programmable-dated-plane-design-in-computer-architecture.

* cited by examiner

COMPILING SYSTEM AND COMPILING METHOD FOR PROGRAMMABLE NETWORK ELEMENT

CROSS-REFERENCE TO RELATED APPLICATIONS

The present application is a continuation of International Application No. PCT/CN2023/101230, filed on Jun. 20, 2023, which claims priority to Chinese Application No. 202210869507.5, filed on Jul. 22, 2022, the contents of both of which are incorporated herein by reference in their entireties.

TECHNICAL FIELD

The present disclosure relates to the field of computer networks and in particular, to a compiling system and a compiling method for a programmable network element.

BACKGROUND

The SDN (Software Defined Network) technology decouples network element devices into a control plane and a data plane. Hardware resources on the data plane can be divided into isomeric programmable resources according to chip architecture, including ASIC switching chip, FPGA chip, x86 multi-core chip, ARM multi-core chip, etc., and can be divided into heterogeneous resources according to functional types, including forwarding, computing, storage, security and other types of peripheral hardware.

In this case, because the programming models provided by different vendors are closely coupled and inconsistent with the chip architecture, developers need to read all the chip manuals when achieving the functions of the programmable network elements including isomeric exchange chips, which results in difficulty in developing network modals and poor program portability. At the same time, developers also need to consider the encapsulation and calling of heterogeneous peripheral hardware resources when programming, which makes the development and deployment of multiple network modals coexist for a long period.

SUMMARY

In view of the shortcomings of the prior art, the present disclosure provides a compiling system and a compiling method, for a programmable network element, which are oriented to various heterogeneous hardware resources and isomeric hardware resources, support the external unification to provide abstract interfaces; a programmable scheduler performs equivalent function replacement on heterogeneous hardware resources, analyzes the capabilities of isomeric hardware resources, and realizes the allocation of appropriate hardware resources to diversified network modals; a pipeline generator calls a compiler related to the underlying hardware resources to compile the network modal files, and automatically generates and optimizes the data packet processing pipeline. The present disclosure shields the details of the differentiation of the underlying heterogeneous hardware resources and isomeric hardware resources for network developers, reduces the difficulty of developing and debugging network modals, which is beneficial to the rapid deployment of diversified network modals.

A compiling system for a programmable network element, including:
a function mapping table arranged on a management node for identifying heterogeneous hardware resources and isomeric hardware resources outside the management node, and persisting a mapping relationship between the heterogeneous hardware resources and the isomeric hardware resources and functions into a formatted table;
an advanced abstract encapsulator arranged at the management node for performing fine-grained homogenization processing on various heterogeneous hardware resources and isomeric hardware resources, packaging differentiated interfaces into a unified abstract interface, constructing a shared general abstract packaging interface that meets elastic extensibility of the heterogeneous hardware resources and the isomeric hardware resources, and abstracting extended interfaces of the heterogeneous hardware resources and the isomeric hardware resources from a hardware layer structure to support an extension of new programming devices and an evolution of existing functional devices;
a programmable scheduler arranged at the management node for enabling diverse network modals to switch and collaborative with each other between the hardware resources according to actual needs, and for allocating the isomeric hardware resources according to modal features, calling other types of the heterogeneous resources, and performing functional equivalent substitution; and
a pipeline generator arranged at the management node for calling a compiler related to the heterogeneous hardware resources to automatically generate and optimize a modal processing pipeline.

Further, the mapping relationship between resources and functions realized by the function mapping table are as follows:
a computing node is functionally mapped into a forwarding node by running a software switch;
the computing node is functionally equivalent to a security node by running a firewall or an intrusion detection system or an encryption software;
the computing node is functionally equivalent to a storage node by running a data packet compression software to reduce buffer resources occupied by data packets; and
the forwarding node is functionally equivalent to the computing node by in-band computing.

Further, calling interfaces of the heterogeneous hardware resources and the isomeric hardware resources are registered, by the unified abstract interface externally provided by the advanced abstract encapsulator, to the advanced abstract encapsulator, so as to abstract the functions of data packet computing, storage, security and forwarding processing from functions of a hardware layer.

Further, the programmable scheduler includes a hardware constraint analyzer, a modal demand analyzer and a modal resource mapper; the hardware constraint analyzer is configured to analyze a capability of the hardware resources of the forwarding node, and persistently save an analysis result in a local file; the modal demand analyzer is configured to acquire characteristics of different network modals, extract and interpret a keyword in a modal file, and permanently save an analysis result of the modal file to the local file; the modal resource mapper is configured to read analysis on the capability of the modal file and the hardware resources, and match the modal files and the forwarding node by using an integer linear programming algorithm.

Further, the pipeline generator is configured to read a high-level intermediate representation generated by a mid-end compiler from a memory, generate one or more configuration files related to hardware after processing the high-level intermediate representation, and trim redundant information unrelated to a pipeline operation in the configuration files to generate configuration files including information related to the pipeline operation.

A compiling method for a programmable network element, wherein the method is implemented based on the compiling system for a programmable network element, and the method includes:

performing integrated representation and function mapping for heterogeneous hardware resources and isomeric hardware resources;

encapsulating differentiated interfaces of various heterogeneous hardware resources and isomeric hardware resources into a unified abstract interface to externally abstract a data plane equipment as a logical network element unrelated to underlying hardware;

realizing functional equivalent replacement among computing resources, forwarding resources, storage resources and security resources in network equipment based on flexible and programmable scheduling between the heterogeneous hardware resources and the isomeric hardware resources; and allocating appropriate hardware resources for diversified network modals based on differentiation capabilities of the heterogeneous hardware resources and the isomeric hardware resources in the logical network element; and starting a distributed compilation process of a compiler related to the various isomeric hardware resources, and automatically generating and optimizing a modal processing pipeline.

Further, after being powered on, the system identifies and detects the heterogeneous hardware resources and the isomeric hardware resources on the programmable network element, and initializes a function mapping table.

The present disclosure has the following beneficial effects:

the compiling system and method for a programmable network element in the present disclosure support users to program diversified network modal services without considering the differences between various heterogeneous hardware resources and isomeric hardware resources on the programmable network element, thus shielding the details of the underlying hardware, improving the development efficiency and reducing the development difficulty and deployment cycle of various network modals;

the compiling system and method for a programmable network element in the present disclosure support the equivalent conversion of the resources and functions of the computing node on the programmable network element to the forwarding node, for example the user realizes the data packet forwarding by running a software switch on the computing node through programming, which makes up the shortage of forwarding resources, improves the resource utilization rate and saves the cost;

the compiling system and method for a programmable network element in the present disclosure support the equivalent conversion of the resources and functions of the computing node on the programmable network element into a security node, for example the user calls security functions such as firewall and IDS on the computing node through programming, which makes up for the shortage of security resources, improves the resource utilization rate and saves the cost;

the compiling system and method for a programmable network element in the present disclosure support the equivalent conversion of the resources and functions of the computing node on the programmable network element into a security node, for example the user realizes the compression of data packets on the computing node through programming, thus reducing the overhead of storage resources, improving the resource utilization rate and saving the cost;

the compiling system and method for a programmable network element in the present disclosure support the equivalent conversion of the resources and functions of the forwarding node on the programmable network element into a computing node, for example the user realizes in-band computing on the forwarding node through programming, thus improving the resource utilization rate and saving the cost;

the compiling system and method for a programmable network element of the present disclosure support the equivalent conversion of the resources and functions of the forwarding node on the programmable network element into a security node, for example the user configures an entry with an approximate security function on the forwarding rule on the forwarding node through programming, thus improving the security forwarding efficiency of data packets and reducing the time delay;

the compiling system and method for a programmable network element in the present disclosure support the capability to analyze isomeric hardware resources, and allocate the resources in combination with the requirements of network modals, thus realizing the decoupling of diversified network modal programming and hardware resources, reducing the difficulty of network development and shortening the network operation and deployment cycle;

the system of the present disclosure not only supports isomeric programmable resources, such as ASIC switching chips, FPGA chips, x86 multi-core chips, ARM multi-core chips, etc., but also has a shared universal extensible interface to support the extension of new programming devices and the evolution of existing functional devices.

DESCRIPTION OF EMBODIMENTS

Hereinafter, the drawings in the present disclosure will be described in detail according to the attached drawings, and the technical scheme in the present disclosure will be described clearly and completely. Obviously, the described embodiments are part of the embodiments of the present disclosure, but not all of them. Based on the embodiments in the present disclosure, all other embodiments obtained by those skilled in the art without creative work belong to the scope of protection of the present disclosure.

First, the technical terms of the present disclosure are explained below:

Heterogeneous hardware resources are classified according to functional types, including computing, storage, security, forwarding and other functional types of resources.

Isomeric hardware resources are classified according to the types of forwarding chip architectures, including FPGA, ASIC, CPU, etc.

Figure 1:
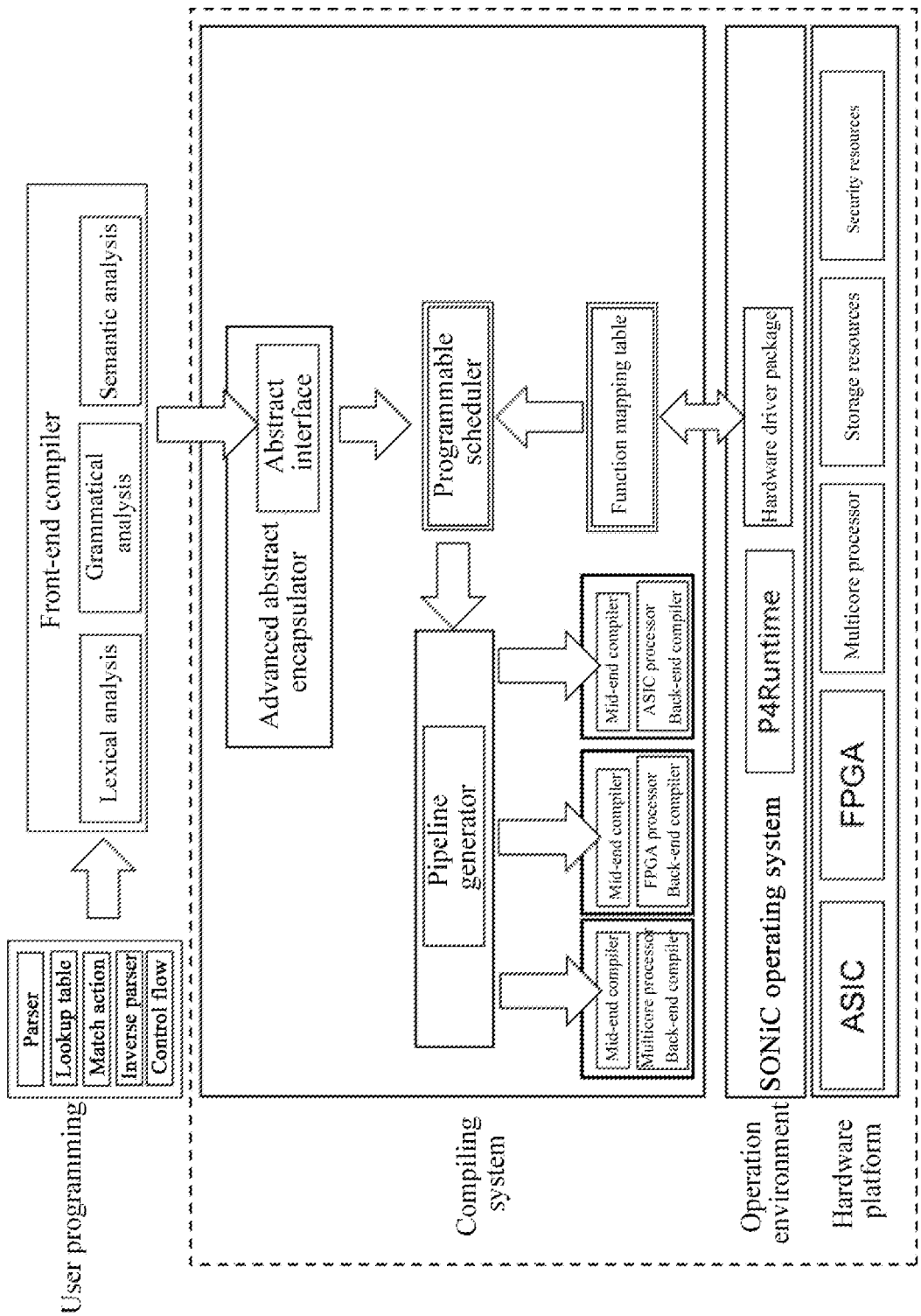
FIG. 1 is an architecture diagram of a compiling system for a programmable network element of the present disclosure.

FIG. 1 is an architecture diagram of a compiling system for a programmable network element of the present disclosure, which runs on a management node and manages isomeric hardware resources and heterogeneous hardware resources of nodes such as computing, storage and security nodes.

Figure 2:
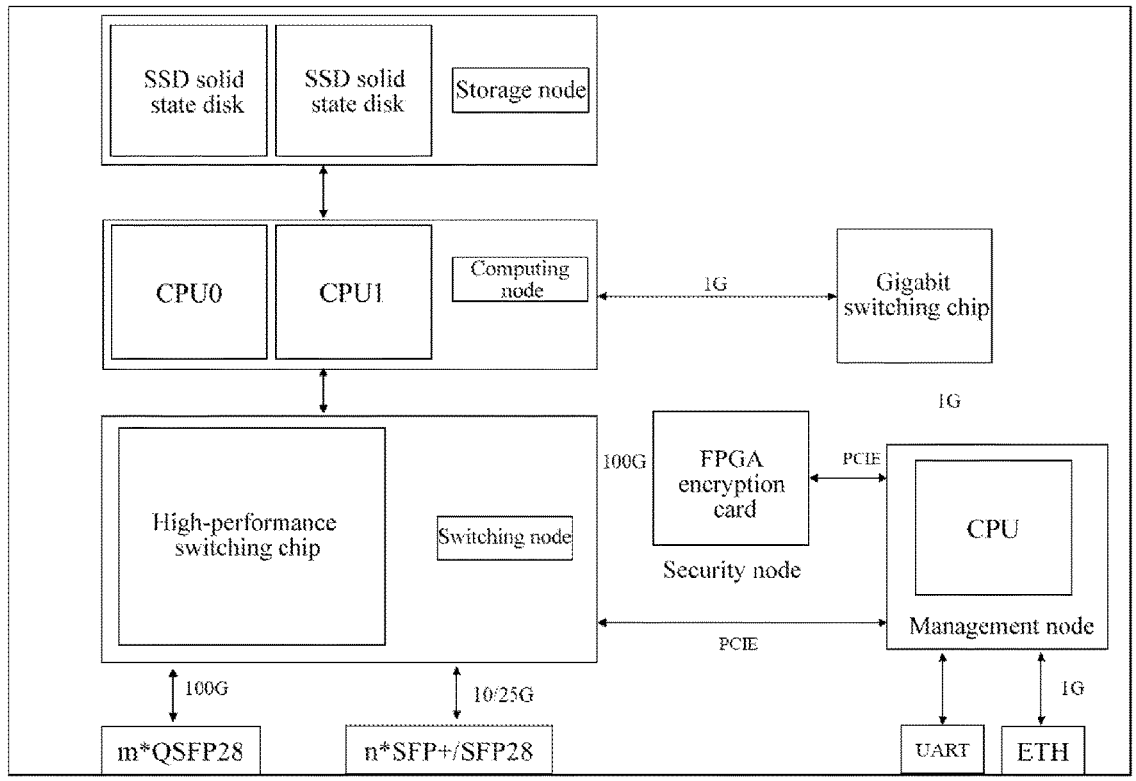
FIG. 2 is a block diagram of a programmable network element integrating heterogeneous hardware resources and isomeric hardware resources.

As shown in FIG. 2, a programmable network element that integrates heterogeneous hardware resources and isomeric hardware resources at least includes a management node and a forwarding node, and other nodes such as computing, storage and security nodes can be extended according to business requirements. After the traffic enters the device through the port, it cannot only be directly forwarded according to the schedule, but can also be pre-treated (accelerated) by FPGA and sent to the CPU, or be directly sent to the CPU through the network card for processing.

The management node is composed of an Intel high-performance CPU, a memory and a hard disk on a motherboard, running the SONiC system and compiling system. The whole software system is based on the SONiC system of a switch, which supports the switch to the server standard CentOS; the computing node communicates with the motherboard through a network line at the bottom by the board card with a x86 or ARM chip architecture, and runs the operating system of the Ubuntu1804LTS version, virtual switches (such as BMv2), firewalls, intrusion detection systems and other software; the storage node is scanned into the motherboard system by a plurality of solid state drives (SSDs) through an SATA bus or accesses the storage server through the network port to communicate with the motherboard; the security node accesses an encryption card through a PCIe bus interface to realize IPsec encryption and decryption of the data packet in a ipv4 modal; the high-performance forwarding chip on the forwarding node uses commercial ASIC chips such as Tofino chips of Intel/Barefoot or domestic Centec ASIC chips to forward data packets. After the programmable network element device is powered on, the agent program on the computing node reports the running status information of software switches, security software, codec software and the like on the computing node to a master program running on the management node through network connection.

If the storage node is connected with the network element equipment by way of a storage server, it also runs the agent program to report the available information of the storage node to the management node; if a SSD is used, the management node will run a special disk writing program to test whether the SSD is available.

The management node accesses and forwards the available state of ASIC chip through an SAI interface.

The compiling system for a programmable network element of the present disclosure specifically includes the following modules:

(I) Function Mapping Table

Figure 3:
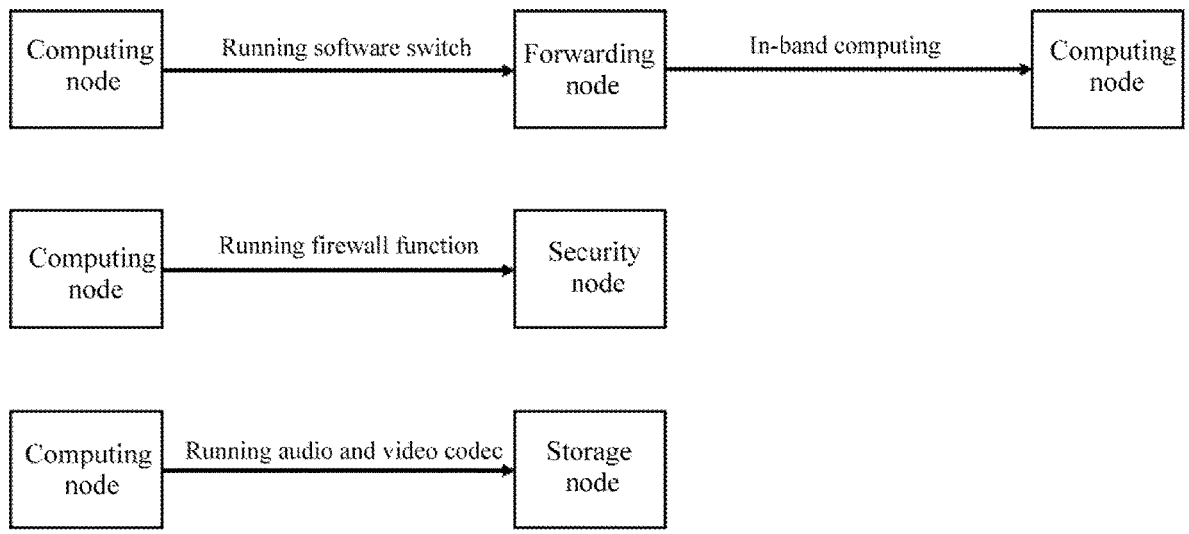
FIG. 3 is a schematic diagram of a function mapping table.

When the system is initialized, a function mapping table is used for performing integrated representation for the heterogeneous resources with equivalent functions; identifying heterogeneous hardware resources and isomeric hardware resources outside the management node, and persisting the mapping relationship between hardware resources and functions in the local file. The functional mapping of heterogeneous hardware resources and isomeric hardware resources is shown in FIG. 3. After the system is started, the functional mapping table integrates the local heterogeneous and isomeric resources according to the available status of the above nodes, that is, a local resource mapping description file res.xml is generated, the format of which is as follows:

```
<?xml version="1.0" encoding="utf-8" standalone="no"?>
  <Resource>
    <cpu number="1001">
      <ipaddr>192.168.100.102</ipaddr>
      <software> bmv2</ software >
      <function> forwarding</ function >
    </cpu >
    <cpu number="1002">
      <ipaddr>192.168.101.102</ipaddr>
      <software> firewall</ software >
      <function> filter</ function >
    </cpu >
    <cpu number="1003">
      <ipaddr>192.168.102.102</ipaddr>
      <software> encoder</ software >
      <function> encode</ function >
    </cpu>
    <switch number="2001">
      <ipaddr>192.168.102.102</ipaddr>
      <software> IPsec </ software >
      <function> encrypt</ function >
    </ switch >
</ Resource >
```

(II) Advanced Abstract Encapsulator

The advanced abstract encapsulator encapsulates the differentiated interfaces of various heterogeneous and isomeric resources into a unified abstract interface, shields the details of hardware differentiation on programmable network elements, and presents them as logical network elements irrelevant to the target architecture, mainly including the following interfaces:

(1) a compilation interface is an interface between a compilation layer and a system layer, which supports the configuration and distribution of compilation results and realizes the definable reconfiguration of isomeric resources;

(2) a northbound interface is a configuration management interface between a common network platform and a controller, and is used to receive all kinds of flow table information generated by the controller of the control plane, guide and decide the data processing behavior of the common network platform, and adopt a protocol interaction mechanism independent of the protocol to support the transmission of user-defined structure and flow table information;

(3) a system management is a function set that forms a common network platform capability, and uses endogenous security to construct a core node function, so as to dynamically and randomly change the static and certainty of the core function, and then provide the protection capability of endogenous security; the system management consists of two parts: operation and maintenance management and isomeric multidimensional resource management; through containerization construction and linkage decoupling between modules, the management of isomeric s multidimensional resources in the hardware layer and the maintenance of controller configuration information are realized; and (4) a southbound interface is the interface between the hardware layer and the system layer, which is a unified abstraction of isomeric chip interfaces such as switching chip, FPGA and multi-core, and provides a series of standardized application programming interfaces (API) on the interface, so that the system layer function no longer cares about the hardware details of isomeric chips in the hardware layer, and adopts a unified way to manage and configure the interfaces.

The advanced abstract encapsulator implements the following functions:

the advanced abstract encapsulator abstracts the extended interface of hardware resources from the structure of the hardware layer to support the extension of new programming devices and the evolution of existing functional devices, and realize the function of shielding the differential details of the underlying hardware from the front-end compiler input;

the advanced abstract encapsulator abstracts the packet processing logic from the hardware layer structure, and constructs an abstract packet header encapsulation structure that can define the packet header types of diverse network modals, a node model that can define parsers and parser state machines, and a multi-stage pipeline structure model that contains multiple packet processing algorithms and user-defined functional functions;

the advanced abstract encapsulator abstracts the compilation process from the isomeric back-end compilation layer, constructs a fine-grained abstract compilation interface, and realizes the distributed software and hardware co-compilation function;

the advanced abstract encapsulator constructs an abstract model where computing resources can be customized and extracted, an abstract model where storage resources can be customized and extracted, an abstract model where security resources can be customized and extracted, and an abstract model where forwarding resources can be customized and extracted, and abstracts the functions of packet computing, storage, security and forwarding from the functions of the hardware layer.

(III) Programmable Scheduler

The programmable scheduler is used for realizing functional equivalent replacement among computing resources, forwarding resources, storage resources and security resources in network equipment; when a certain type of resources are insufficient, other types of heterogeneous hardware resources are called to perform functional equivalent replacement according to the software and hardware resources counted by the function mapping table and the functions that can be realized by the software and hardware.

The programmable scheduler reads the local resource mapping description file res.xml, and realizes the functional equivalent replacement among computing resources, forwarding resources, storage resources and security resources in network equipment according to certain forwarding rules;

Rule 1: when there are many kinds of input network modals, the computing node running the software switch is functionally equivalent to a forwarding node, which is responsible for forwarding some network modal packets;

Rule 2: when the network modal file contains encrypted services, the computing node running the security software is functionally equivalent to a security node, which undertakes the encryption and decryption of some network modal packets;

Rule 3: when the storage service is included in the network modal file, the computing node running the codec software is functionally equivalent to a storage node, which undertakes the codec processing of some network modal packets;

Rule 4: when the network modal file contains computing services, the forwarding node with in-band computing hardware capability is functionally equivalent to a computing node, which undertakes the computing processing of some network modal packets; and Rule 5: when the network modal file contains security services, such as data packet filtering, the forwarding node with hardware capabilities (such as the endogenous security protection interchange integrated circuit "Xuanwu Core" ESW5610 independently developed by China) is functionally equivalent to a security node, which undertakes the security processing of some network modal packets.

Figure 4:
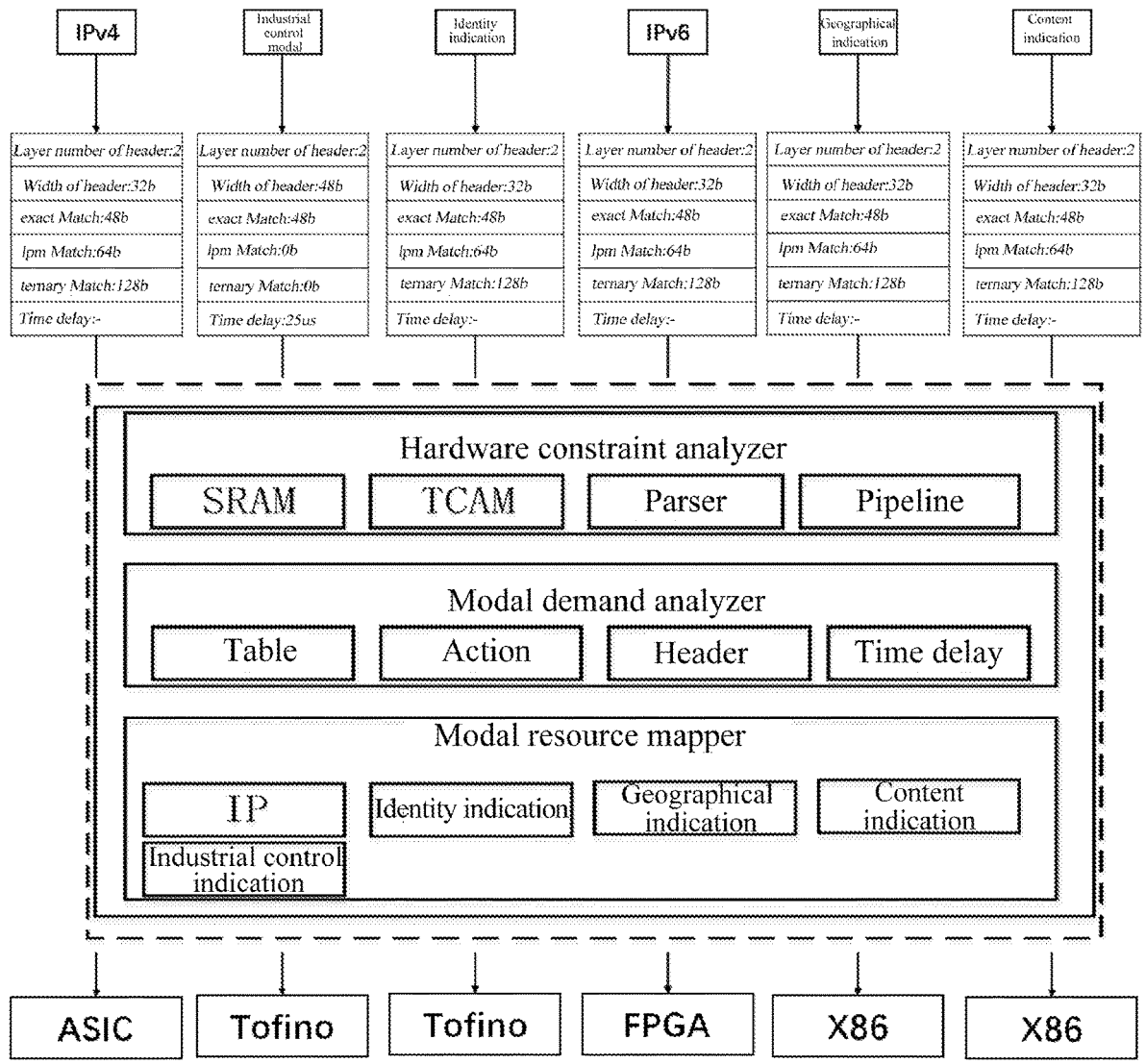
FIG. 4 is a functional diagram of a programmable scheduler.

Based on the differentiation capability of the heterogeneous and isomeric resources in logical network elements, a variety of heterogeneous and isomeric resources are allocated for the abstract resource requirements of diversified network modal files. As shown in FIG. 4, files in powerlink modal and mf modal are allocated to the Tofino chip, files in ipv6 modal are allocated to the FPGA chip, and files in geo modal and ndn modal are allocated to the software switches on the CPU. If the resource allocator allocates multiple network modal files to a switching chip, it is necessary to synthesize a file to be submitted to the mid-end and back-end compilers, such as fiels of geo modal and ndn modal are merged into geo_ndn.json, and is submitted to BMv2 running on the CPU to continue compiling and running, and the forwarded packets of geo and ndn protocols are processed.

The programmable scheduler includes a hardware constraint analyzer, a modal demand analyzer and a modal resource mapper.

The hardware constraint analyzer analyzes the capability of the hardware resources of the forwarding node, including a header parser and a pipeline. The hardware capability of the packet header parser refers to parsing the maximum number of layers of the network modal protocol packet header and the word length of single transmission data, that is, the bus width. The hardware capability of the pipeline refers to the number of stages in the pipeline and the cache type (SRAM and TCAM, etc.) and the cache capacity (kB) contained in each stage. The hardware constraint analyzer persistently saves the analysis results in a local file hal.xml.

A modal program consists of a programming model, a header parser, a match+action logic table containing multiple serial or parallel processes, and a control flow description. The modal demand analyzer obtains the characteristics of different network modals and extracts and interprets the keywords in the modal file. The resource requirements of network modals include the following:

(1) the size and number of match-action items;
(2) the number of protocol layers and the width of the packet header; and
(3) the type and size of the logical table cache and dependency.

The number of matching actions with the longest dependency is the network modal length. The modal demand analyzer persists the analysis results of modal files into local files, such as ipv4_request.json.

A modal resource mapper is used to read modal files and analyze hardware resources, and use an integer linear programming algorithm for matching, which is specifically as follows:

logical tables are allocated according to the capacity of cache resources. For example, a logical table II includes e ti entries, and the sum of entries of all cache resources of type m that can be allocated to the logical table must be greater than $e_{tl}$, as shown in the following formula:

$$\forall tl: \sum_{tl,m} \geq e_{tl}$$

where the number $b_m$ of cache resources of type m must be greater than the required number $U_{l,m}$ of the logical table tl, see the following equation:

$$\forall m: U_{tl,m} \leq b_m$$

The modal resource mapper enumerates all modals according to the processing performance of isomeric chips of the forwarding node from high to low. If a modal is not allocated to a suitable forwarding node and cannot generate a data packet processing pipeline, an error will be reported and the reason for the error will be prompted. Otherwise, the chip with high performance is preferred to distribute the modal file, and the modal file is transmitted to the designated location through the transmission module.

(IV) Pipeline Generator

The pipeline generator calls the compiler related to isomeric hardware resources. Aiming at the isomeric characteristics of integrating heterogeneous hardware resources such as storage, forwarding and computing resources into data plane devices, the compiler extracts the key elements of the data plane, abstracts a set of operation instruction sets (including control primitives, storage primitives, computing primitives and forwarding primitives), describes the data plane flexibly, and realizes the decoupling between the data plane and the control plane and the standardization of interfaces.

A front-end compiler first divides the source file into independent marks and words according to grammar, replaces and deletes invalid characters such as tabs and spaces, and classifies grammatical marks or phrases according to the relevant auxiliary grammar in the comments. The front-end compiler judges the correctness of the code structure between different groups from the grammatical point of view, analyzes the meaning of the whole source file, checks out logical loopholes, launches nested loops, and generates intermediate representations. The intermediate representation includes detailed description and debugging information of message processing, and description information related to hardware, etc.

A back-end compilers related to various isomeric hardware resources read intermediate representations from a memory, and generate one or more hardware-related configuration files after processing, and cut redundant information unrelated to pipeline operation in the configuration files to generate configuration files including information related to the operation. The configuration file is a description of the data packet processing pipeline by the switching chip, which includes a lot of redundant information irrelevant to the pipeline operation.

Figure 5:
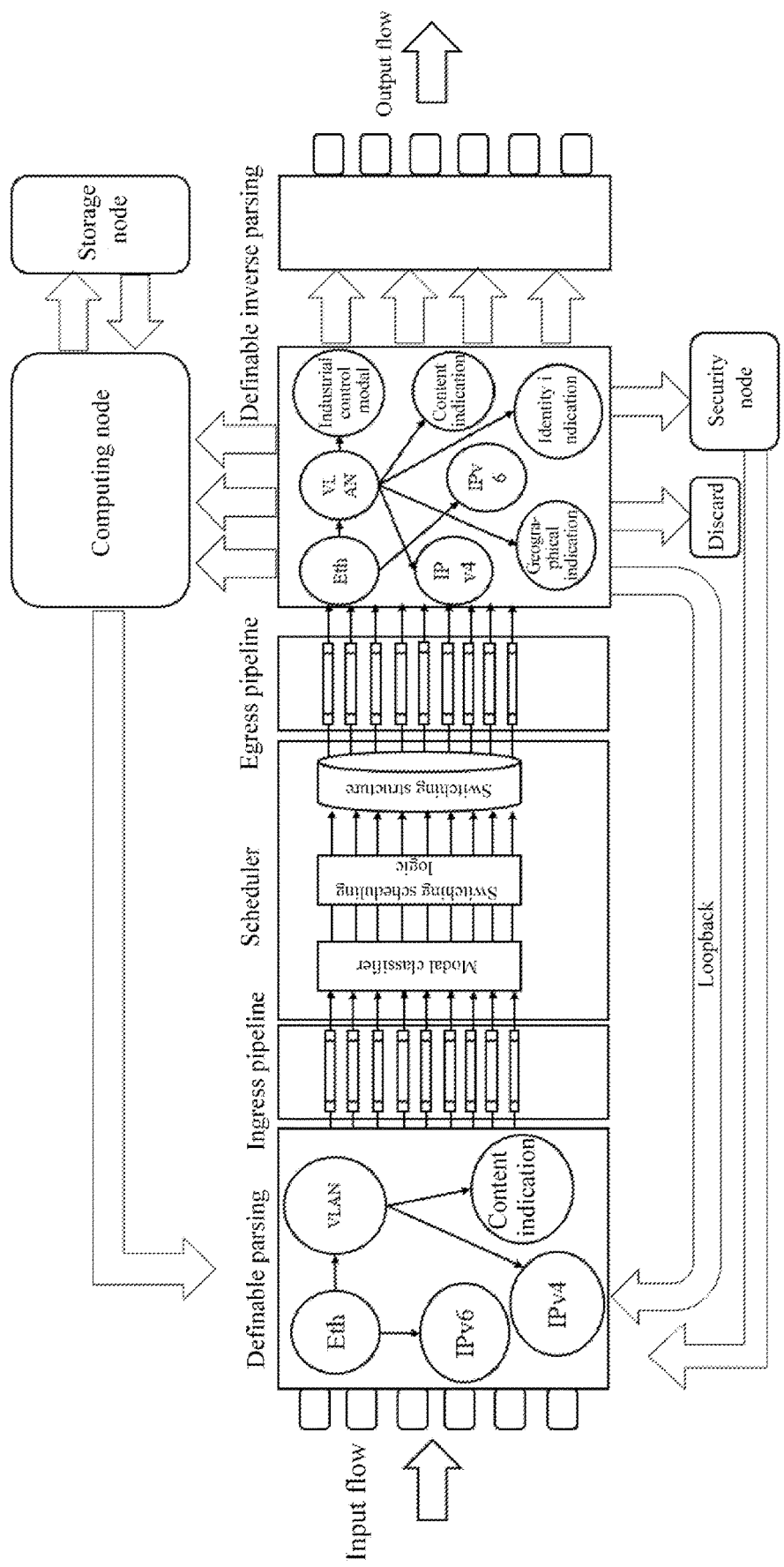
FIG. 5 is a modal processing pipeline.

The pipeline information described in the configuration file is written into a variety of isomeric hardware resources, and use the isomeric hardware resources for serial/parallel processing collaboratively and efficiently to automatically generate and optimize the modal processing pipeline, as shown in FIG. 5:

(1) The input traffic contains diversified network modal data packets, which enter the Parser in turn, and the Parser recognizes Ethernet header and IPv4 header in turn. If any of these headers are missing, the Parser will terminate with an error. Parser extracts the information in these headers into a Parsed_packet structural body; then the information enters the Ingress pipeline for Match-Action processing, and lookup keys are constructed from the data packet fields or the processed metadata parameters; key is used to perform table lookup, and an action (including relevant data) is selected to perform;

(2) the data packet is transmitted to the scheduler for processing, which firstly classifies the data packet into different buffer areas according to the modal type, then transmits data packet to the switching scheduling logic, judges according to the scheduling algorithm and sends it to the Egress pipeline, and finally transmits it to the Egress pipeline through a switching structure;

the data packet is passed to the Egress pipeline (Egress). If there are operations such as computing, storage and security, it will enter the corresponding heterogeneous hardware resources for accelerated processing, and then it will be passed to the Deparser for packet reassembling.

The data packet enters an inverse parser, the data packets are combined and sent to an output port; if the pipeline defines a packet loss operation, sending the packet to the discard port will cause the packet to disappear; if a forwarding operation is defined, the data packet is sent to the output Ethernet port and sent out on the corresponding physical interface; if the output interface is already busy sending another packet, the packet may be put in the queue. When the data packet is sent, the physical interface calculates a correct Ethernet checksum tail and appends it to the data packet; if it is defined that the data packet transmitted to the control plane through the output CPU port is the original input packet, not the data packet received from Deparser, the latter data packet is discarded; if the packet is defined to be sent to the input loopback port through the output loopback port, loopback processing can be used when the packet processing cannot be completed in one process;

the data packet arrives at the Egress pipeline and is sent out.

After the diversified network modal data packets enter the network element port, they will be accelerated through the forwarding node, storage node, computing node and security node in turn according to the description of the pipeline.

Figure 6:
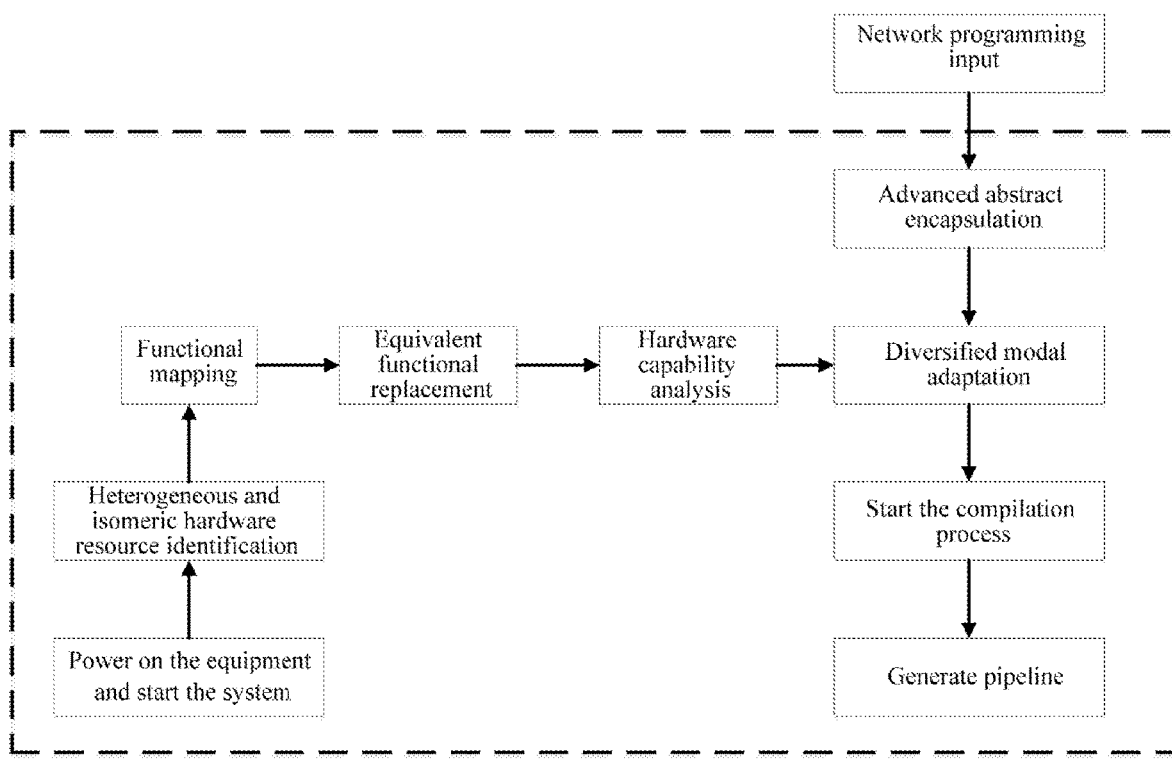
FIG. 6 is a flowchart of a compilation method for a programmable network element.

As shown in FIG. 6, the compiling method for a programmable network element of the present disclosure includes the following steps:

(1) after the system is powered on, the heterogeneous hardware resources and isomeric hardware resources on the programmable network element are identified and detected, and the heterogeneous hardware resources and isomeric hardware resources are described by fine-grained homogenization, that is, performing integrated representation and functional mapping for the heterogeneous hardware resources and isomeric hardware resources;

(2) a function mapping table is initialized;

(3) differentiated interfaces of a variety of heterogeneous hardware resources and isomeric hardware resources are encapsulated into a unified abstract interface, and the external abstraction of the data plane equipment as a logical network element irrelevant to the underlying hardware is realized;

(4) the hardware calling information related to computing/storage/security/forwarding is sensed from the context of the input file, and based on flexible and programmable scheduling between the heterogeneous hardware resources and the isomeric hardware resources, functional equivalent replacement among computing resources, forwarding resources, storage resources and security resources in network equipment is realized; based on the differentiation capability of heterogeneous hardware resources and isomeric hardware resources in logical network elements, appropriate hardware resources are allocated for diversified network modals; and (5) the compilers related to the underlying hardware resources are called, a distributed compilation process is started, and the modal processing pipelines are automatically generated and optimized.

It can be understood by those skilled in the art that the above is only a preferred example of the present disclosure, and it is not used to limit the present disclosure. Although the present disclosure has been described in detail with reference to the above examples, it is still possible for those skilled in the art to modify the technical scheme described in the above examples or replace some technical features equally. Any modification and equivalent substitution within the spirit and principle of the present disclosure should be included in the scope of protection of the present disclosure.

What is claimed is:

1. A compiling system for a programmable network element, comprising:

a function mapping table arranged on a management node for identifying heterogeneous hardware resources and isomeric hardware resources outside the management node, and persisting a mapping relationship between the heterogeneous hardware resources and the isomeric hardware resources and functions into a formatted table; wherein the heterogeneous hardware resources are classified according to functional types, comprising resources of computing, storage, security and forwarding functional types; the isomeric hardware resources are classified according to types of forwarding chip architectures, comprising a Field Programmable Gate Array (FPGA), an Application-Specific Integrated Circuit (ASIC) and a Central Processing Unit (CPU) CPU;

an advanced abstract encapsulator arranged at the management node for performing fine-grained homogenization processing on various heterogeneous hardware resources and isomeric hardware resources, packaging differentiated interfaces into a unified abstract interface, constructing a shared general abstract packaging interface that meets elastic extensibility of the heterogeneous hardware resources and the isomeric hardware resources, and abstracting extended interfaces of the heterogeneous hardware resources and the isomeric hardware resources from a hardware layer structure to support an extension of new programming devices and an evolution of existing functional devices;

a programmable scheduler configured for realizing functional equivalent replacement among computing resources, forwarding resources, storage resources and security resources in network equipment; wherein when a certain type of resources is insufficient, other types of heterogeneous hardware resources are called according to software and hardware resources counted by the function mapping table and functions that is capable of being implemented by the software and hardware resources, in such a manner to perform functional equivalent replacement; and a pipeline generator arranged at the management node for calling a compiler related to the heterogeneous hardware resources to automatically generate and optimize a pipeline for processing network modal data packets.

2. The compiling system for a programmable network element according to claim 1, wherein the mapping relationship between resources and functions realized by the function mapping table are as follows:

a computing node is functionally mapped into a forwarding node by running a software switch;

the computing node is functionally equivalent to a security node by running a firewall or an intrusion detection system or an encryption software;

the computing node is functionally equivalent to a storage node by running a data packet compression software to reduce buffer resources occupied by data packets; and the forwarding node is functionally equivalent to the computing node by in-band computing.

3. The compiling system for a programmable network element according to claim 1, wherein calling interfaces of the heterogeneous hardware resources and the isomeric hardware resources are registered, by the unified abstract interface externally provided by the advanced abstract encapsulator, to the advanced abstract encapsulator, in such a manner to abstract the functions of data packet computing, storage, security and forwarding processing from functions of a hardware layer.

4. The compiling system for a programmable network element according to claim 1, wherein the programmable scheduler comprises a hardware constraint analyzer, a modal demand analyzer and a modal resource mapper; the hardware constraint analyzer is configured to analyze a capability of the hardware resources of the forwarding node and persistently save an analysis result in a local file; the modal demand analyzer is configured to acquire characteristics of different network modals, extract and interpret a keyword in a modal file, and permanently save an analysis result of the modal file to the local file; the modal resource mapper is configured to read analysis on the capability of the modal file and the hardware resources, and match the modal file and the forwarding node by using an integer linear programming algorithm.

5. The compiling system for a programmable network element according to claim 1, wherein the pipeline generator is configured to read a high-level intermediate representation generated by a mid-end compiler from a memory, generate one or more configuration files related to hardware after processing the high-level intermediate representation, and trim redundant information unrelated to a pipeline operation in the configuration files to generate configuration files comprising information related to the pipeline operation.

6. A compiling method for a programmable network element, wherein the method is implemented based on the compiling system for a programmable network element according to claim 1, and the method comprises:
- performing integrated representation and function mapping for heterogeneous hardware resources and isomeric hardware resources;
- encapsulating differentiated interfaces of various heterogeneous hardware resources and isomeric hardware resources into a unified abstract interface to externally abstract a data plane equipment as a logical network element unrelated to underlying hardware;
- realizing functional equivalent replacement among computing resources, forwarding resources, storage resources and security resources in network equipment based on flexible and programmable scheduling between the heterogeneous hardware resources and the isomeric hardware resources; and allocating appropriate hardware resources for diversified network modals based on differentiation capabilities of the heterogeneous hardware resources and the isomeric hardware resources in the logical network element; and
- starting a distributed compilation process of a compiler related to the various isomeric hardware resources, and automatically generating and optimizing a modal processing pipeline.

7. The compiling method for a programmable network element according to claim 6, wherein after being powered on, the system identifies and detects the heterogeneous hardware resources and the isomeric hardware resources on the programmable network element, and initializes a function mapping table.

* * * * *